United States Patent
Tomanec et al.

[15] 3,683,698
[45] Aug. 15, 1972

[54] TENSOMETRIC GAS AND LIQUID PRESSURE SENSING ELEMENT

[72] Inventors: Ladislav Tomanec; Karel Pospísil, both of Prague, Czechoslovakia

[73] Assignee: Ceskoslovenska akademie ved, Prague, Czechoslovakia

[22] Filed: May 14, 1971

[21] Appl. No.: 143,360

[30]     Foreign Application Priority Data

May 14, 1970   Czechoslovakia.........3352/70
March 15, 1971   Czechoslovakia.........1873/71

[52] U.S. Cl. ..............73/398 AR, 73/88.5 SD, 338/4
[51] Int. Cl................................................G01l 9/06
[58] Field of Search..........73/146, 398 AR, 88.5 SD; 338/4, 42

[56]         References Cited

UNITED STATES PATENTS 3,537,319   11/1970   Yerman................73/88.5 SD

Primary Examiner—Donald O. Woodiel
Attorney—Arthur O. Klein

[57]         ABSTRACT

A tensometric fluid pressure sensing element with a main circular diaphragm provided on its edge with at least two recesses each forming a smaller diaphragm carrying resistors in a bridge circuit. The main diaphragm is preferably made of a semiconductor material and the resistors on the smaller diaphragms are diffused therein.

13 Claims, 6 Drawing Figures

INVENTORS:
LADISLAV TOMANEC
KAREL POSPISIL
BY:
Arthur O. Klein
ATTORNEY

Patented Aug. 15, 1972

INVENTORS:
LADISLAV TOMANEC
KAREL POSPISIL
BY:

*Arthur O. Klein*
ATTORNEY

Patented Aug. 15, 1972

INVENTORS:
LADISLAV TOMANEC
KAREL POSPISIL
BY:
*Arthur O. Klein*
ATTORNEY

TENSOMETRIC GAS AND LIQUID PRESSURE SENSING ELEMENT

BACKGROUND OF THE INVENTION

1. Field of the Invention

The invention relates to a tensometric gas and liquid (fluid) pressure pick-up or sensing element. This type of pressure sensing element comprises a circular diaphragm the circumference of which is in a fixed, clamped condition. On the diaphragm there are arranged resistors in a bridge circuit. Pressure sensing is accomplished by making use of the piezo-resistance phenomenon, resistor conductivity depending on the deformation of the diaphragm when subjected to different pressures on its opposite sides.

2. Description of the Prior Art

In prior, known sensing elements of this type, the circular main diaphragm has a constant or variable thickness, but the resistors always pick up the deformations of the entire diaphragm.

Such known sensing elements have the disadvantage that their sensitivity is rather low because an increase in the diaphragm diameter and a reduction in its thickness are limited by the non-linear dependence of the diaphragm deformation on the measured pressure. Profiling the diaphragm partly eliminates this drawback, but the sensitivity achieved is still not sufficient to permit accurate measurements without the necessity of using complicated measuring and indicating instruments.

Another drawback of such known devices of this type resides in their temperature dependence. This is due to the fact that the bridge circuit eliminates the temperature dependence only if the temperature of all resistors of the bridge is the same. This, however, is not the case with a relatively large diaphragm surface. Compensation of the temperature effect under such conditions requires additional equipment.

SUMMARY OF THE INVENTION

It is a general object of the invention to eliminate the drawbacks of the known state of the art.

Another object of the invention is to provide a novel tensometric gas and liquid pressure sensing element which is free of the above-mentioned drawbacks.

Still another object of the invention is to provide a novel tensometric gas and liquid pressure sensing element comprising a circular diaphragm, made, for example, of a semiconductor material on which there are provided resistors in a bridge circuit arrangement.

Yet another object of the invention is to provide a tensometric gas or liquid pressure sensing element in which a main diaphragm is provided with at least two circular recesses each of which forms a smaller diaphragm on which there is arranged a resistor.

Another object of the invention is the provision of a tensometric pressure sensing element in which there are at least two smaller diaphragms, one axis of each of the smaller diaphragms being identical with the axis of the main diaphragm. The distance from the center of the main diaphragm to the nearest place of the edge of a smaller diaphragm is larger than 0.58 of the radius of the main diaphragm.

Yet another object of the invention is to provide a sensing element of the type just described but in which the distance from the center of the main diaphragm to the nearest place of the edge of a smaller diaphragm is equal to 0.58 of the radius of the main diaphragm.

Still another object of the invention is the provision of a tensometric sensing element of the above type in which a first and third resistor of a first smaller diaphragm, and a first and third resistor of a second smaller diaphragm are located on their axes in common with the axis of the main diaphragm, each first and third resistor lying adjacent the outer edge of the respective smaller diaphragm, while the second and fourth resistor of the first smaller diaphragm, and the second and fourth resistor of the second smaller diaphragm are arranged at right angles to the axes of the first and third resistors near the center of the respective smaller diaphragms.

In accordance with another feature of the invention, four resistors of each smaller diaphragm are connected in a bridge circuit, and the two bridges are arranged in parallel with each other.

In accordance with yet another feature of the invention, each of two separate resistors of a first smaller diaphragm arranged on the axis of a main diaphragm are connected in series with one resistor of a second smaller diaphragm also arranged on the axis of the main diaphragm, while each of two resistors of the first smaller diaphragm which are arranged at right angles to the axis of the main diaphragm is connected in series with one resistor of the second smaller diaphragm which is also arranged at right angles to the axis of the main diaphragm, these series combinations of two resistors forming individual branches of a complex bridge.

Another object of the invention is to provide a tensometric sensing element of the above-mentioned type wherein nearer to the center of the main diaphragm than to the first and second smaller diaphragm there are arranged in opposite relationship two further recesses forming a third and fourth smaller diaphragm provided with resistors, the outer edges of the third and fourth smaller diaphragms being as near as possible to an imaginary circle coaxial of the center of the main diaphragm, said imaginary circle being substantially tangent to the inner edges of the first and second smaller diaphragm.

Yet another object of the invention is a tensometric sensing element of the above-described type on each smaller diaphragm in which there are resistors forming aseparate bridge, the output diagonal leads of the individual smaller diaphragms being connected in series.

The above objects and features of the invention and its various advantages will be best understood from the following specification when read in conjunction with the accompanying drawings illustrating preferred examples of embodying the invention. In the drawings:

DESCRIPTION OF THE PREFERRED EMBODIMENTS

Figure 1:
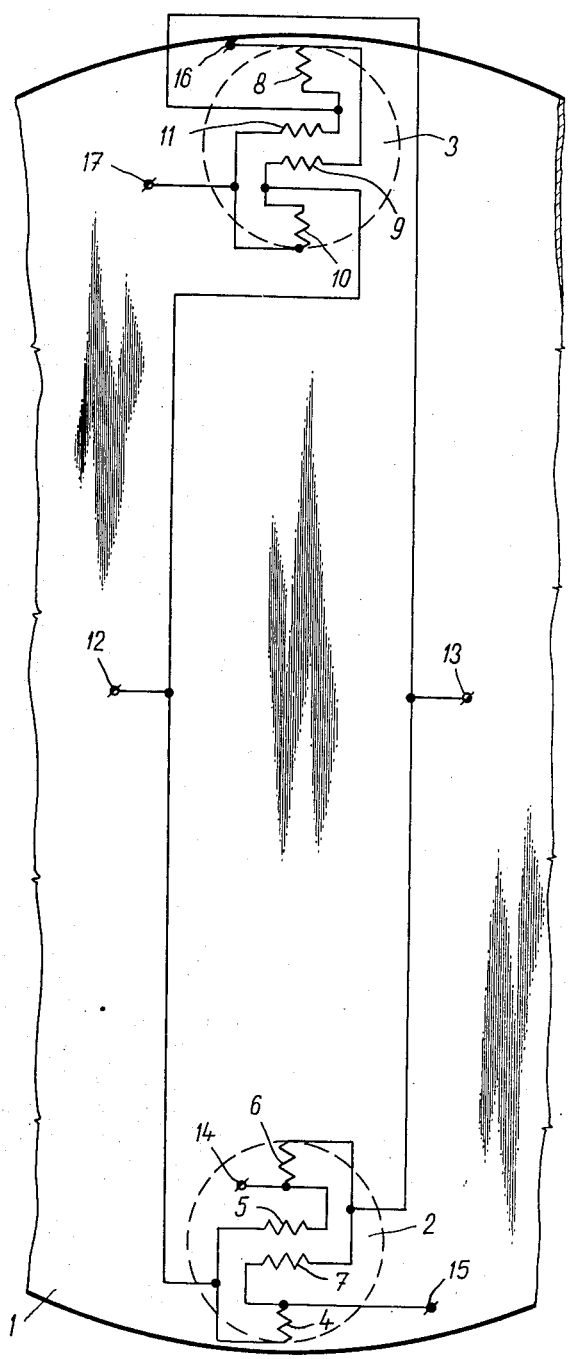
FIG. 1 is a view in plan on an enlarged scale of a semiconductor main diaphragm of a tensometric sensing element, said main diaphragm being provided with two smaller diaphragms and with resistors connected in two parallelly arranged full-bridge circuit arrangements.
Figure 2:
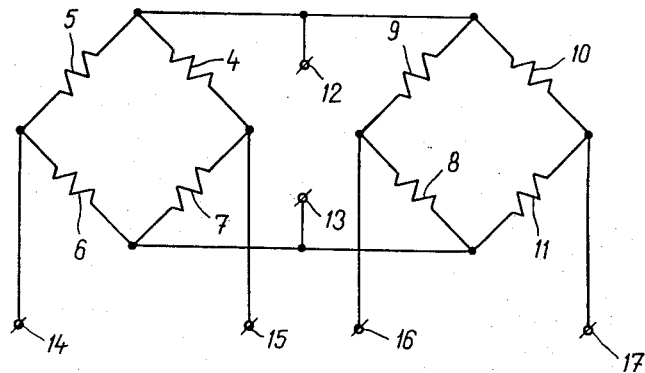
FIG. 2 is a diagram of a bridge circuit arrangement according to FIG. 1.

Referring now more particularly to the first illustrative embodiment, shown in FIGS. 1 and 2, it can be seen that a semiconductor circular main diaphragm 1 has on its outer edge two diametrically oppositely located circular recesses one axis of each of which is the same as the axis or diameter of the main diaphragm 1. Each recess forms with its flat bottom one wall of a smaller diaphragm 2, 3. The diaphragms 2 and 3 are identical. Into the second wall of the smaller diaphragm 2 there are diffused four resistors 4, 5, 6, 7 and into the second wall of diaphragm 3 there are diffused four resistors 8, 9, 10, and 11. In an actual embodiment, the diameter of the main diaphragm is 10 mm for a pressure range up to 700 torr, the diameter of each of the recesses 2 and 3 is 1.5 mm, and the thickness of the main diaphragm is 0.1 mm, the thickness of each of the smaller diaphragms 2, 3 formed by the recesses is 0.05 mm. The distance from the center of the main diaphragm 1 to the nearest place of the edge of each of the smaller diaphragms 2, 3 is 0.58 of the diameter of the main diaphragm 1. The resistors are arranged on the smaller diaphragms 2, 3 in such a manner that the first and third resistors 4, 6 of the smaller diaphragm 2, and the first and third resistors 8, 10 of the second diaphragm 3 are on the axes (diameters) of the smaller diaphragms 2, 3 which coincide with the axis (diameter) of the main diaphragm 1, such resistors being arranged close to the edges of the smaller diaphragms 2, 3, while the second and fourth resistors 5, 7 of the first smaller diaphragm 2, and the second and fourth resistors 9, 11 of the second smaller diaphragm 3 are located at right angles to the said coincident diameters of the main and smaller diaphragms on both sides of the centers of the smaller diaphragms 2, 3.

It can be further seen from FIG. 1 that the first resistor 4 of the first smaller diaphragm 2, and the first resistor 8 of the second smaller diaphragm 3 are situated near those edges of the smaller diaphragms 2, 3 which are on the edge of the main diaphragm 1. The third resistor 6 of the first smaller diaphragm 2 and the third resistor 10 of the second smaller diaphragm 3 are situated near the edges of the smaller diaphragms 2, 3 which are nearer to the center of the main diaphragm 1. The second resistor 5 of the first smaller diaphragm 2 and the second resistor 9 of the second smaller diaphragm 3 are nearer to the center of the main diaphragm 1, and the fourth resistor 7 of the first smaller diaphragm 2 and the fourth resistor 11 of the second smaller diaphragm 3 are further away from the center of the main diaphragm 1.

As schematically illustrated in FIG. 2, the first and third resistors 4, 6 and the second and fourth resistors 5, 7 of the first smaller diaphragm 2, that is, resistors deformed in an identical sense, form opposite sides of one bridge in a known manner. In a similar manner, the first and third resistors 8, 10, and the second and fourth resistors 9, 11 of the second smaller diaphragm 3 form opposite sides of a second bridge. One diagonal of one bridge and one diagonal of the second bridge are connected in parallel and to the supply terminals 12, 13 of a parallel bridge circuit connection. The second diagonal of the first bridge is connected to the output terminals 14, 15 of the first bridge, and the second diagonal of the second bridge is connected to the output terminals 16, 17 of the second bridge.

The tensometric sensing element in accordance with FIG. 1 functions as follows:

The first and third resistors 4, 8, 6, 10 of the two smaller diaphragms 2, 3 pick up radial deformations both of the main diaphragm 1 and of the smaller diaphragms 2, 3. The sum of these deformations gives the value of the resultant deformation picked up on the smaller diaphragms 2, 3. The second and fourth resistors 5, 9, 7, 11 of the two smaller diaphragms 2, 3 pick up tangential deformations also both of the main diaphragm and the two smaller diaphragms 2, 3. Their sum gives the value of the resultant tangential deformation picked up on the smaller diaphragms 2, 3. In this manner a higher average or medium deformation sensitivity of the main diaphragm 1 is achieved. As in prior, known solutions, due to piezoresistance in the semiconductor diaphragm during its deformation there occurs a change in the sensitivity of the diffused resistors. Across the outputs of the two bridges there appears a voltage proportional to the deformations and thus to the measured pressure. Two instruments are used for picking up or sensing such voltages, and the results are added up.

Figure 4:
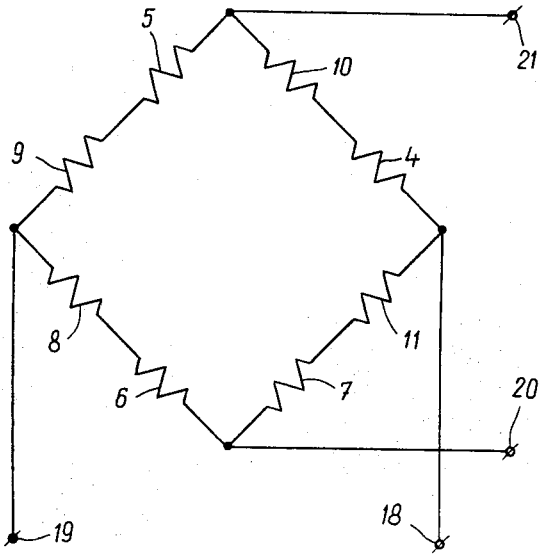
FIG. 4 is a diagram of a bridge circuit arrangement according to FIG. 3.
Figure 3:
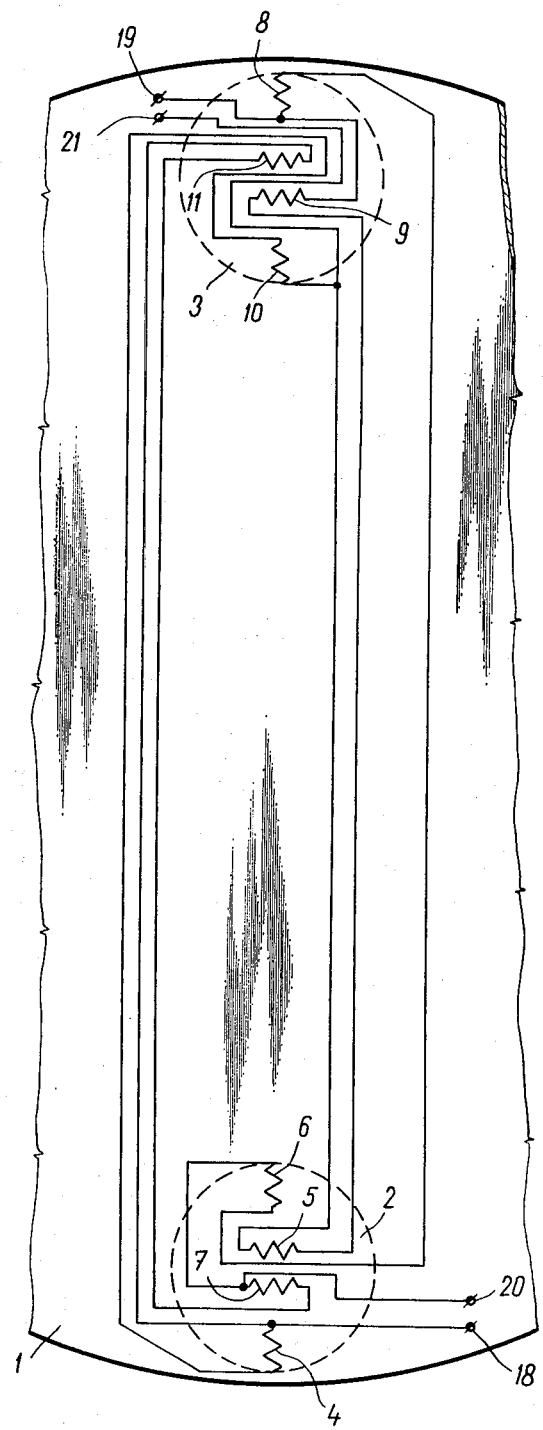
FIG. 3 is a view in plan on an enlarged scale of a main diaphragm identical with that of FIG. 1 but with resistors connected in a single complex bridge with two resistors in each branch.

In FIGS. 3 and 4, which illustrate a second embodiment of tensometric sensing element according to the invention, the same or similar parts are designated by the same reference characters as FIGS. 1 and 2 but with the postscript a. In the diaphragm of the tensometric sensing element illustrated in FIGS. 3 and 4 of the main diaphragm 1a is provided with two identical smaller diaphragms 2a, 3a, and the location of resistors 4a, 5a, 6a, 7a, and 8a, 9a, 10a, 11a, are the same as shown in FIG. 1. But they differ from each other by the connection of these resistors.

As schematically illustrated in FIG. 4, the series connection of the first resistor 4a of the first smaller diaphragm 2a and of the third resistor 10a of the second smaller diaphragm 3a, and the series connection of the third resistor 6a of the first smaller diaphragm 2a, and the first resistor 8a of the second smaller diaphragm 3a form two opposite sides of a complex bridge. The series connection of the second resistors 5a, 9a, of the two smaller diaphragms 2a, 3a, and the series connection of the fourth resistors 7a, 11a of the two smaller diaphragms 2a, 3a form the remaining two opposite sides of a complex bridge. One of the diagonals of this complex bridge is connected to the supply terminals 18a, 19a, and its second diagonal is connected to the output terminals 20a, 21a of the bridge.

The function of the tensometric sensing element in the embodiment illustrated in FIG. 3 is the same with respect to the transfer of the deformations of the main diaphragm 1a and the smaller diaphragms 2a, 3a on the diffused resistors 4a, 5a, 6a, 7a, 8a, 9a, 10a, 11a. By connection into a complex bridge one obtains across the output terminals 20a, 21a one voltage proportional to the measured pressure which permits sensing by only one instrument.

Figure 5:
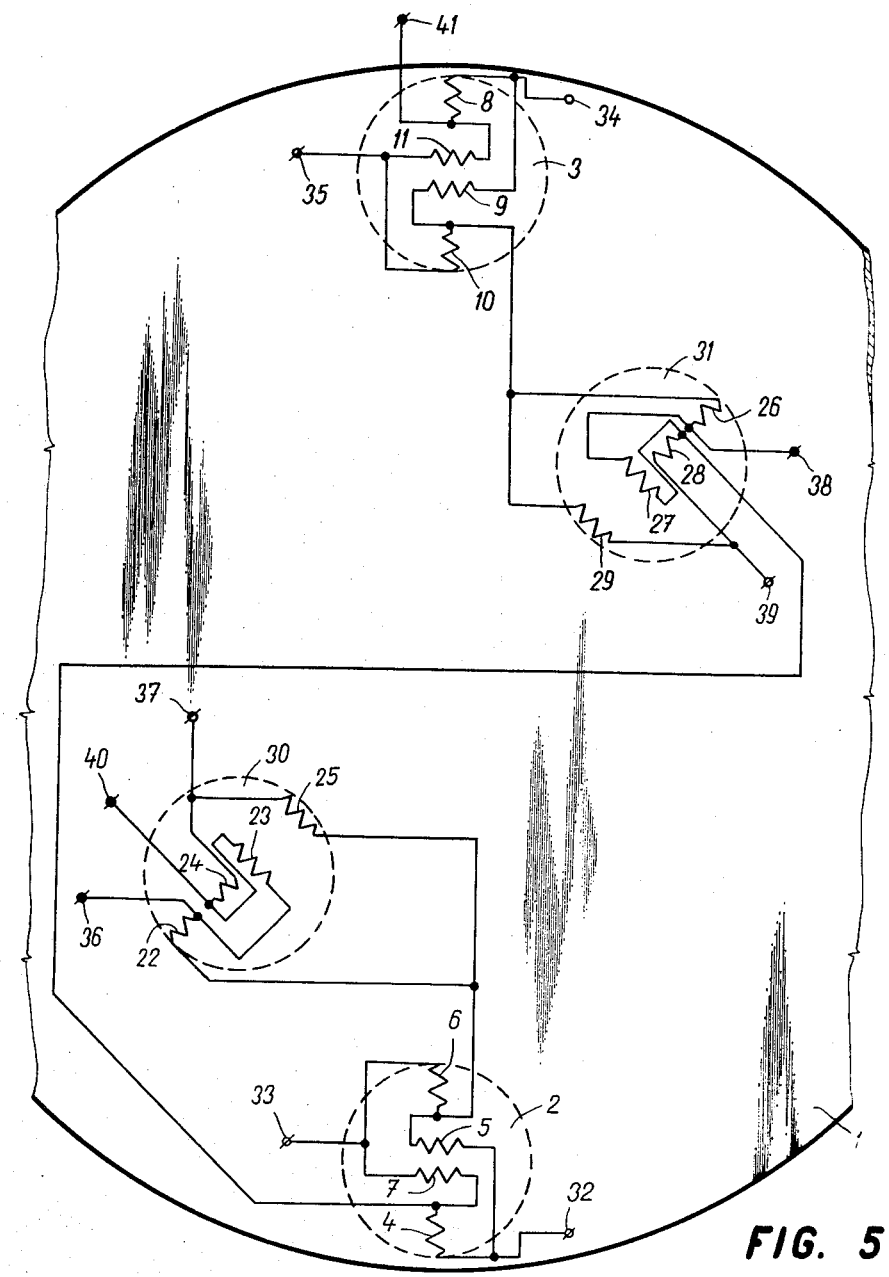
FIG. 5 is a view in plan of a main diaphragm with four smaller diaphragms with diffused resistors.
Figure 6:
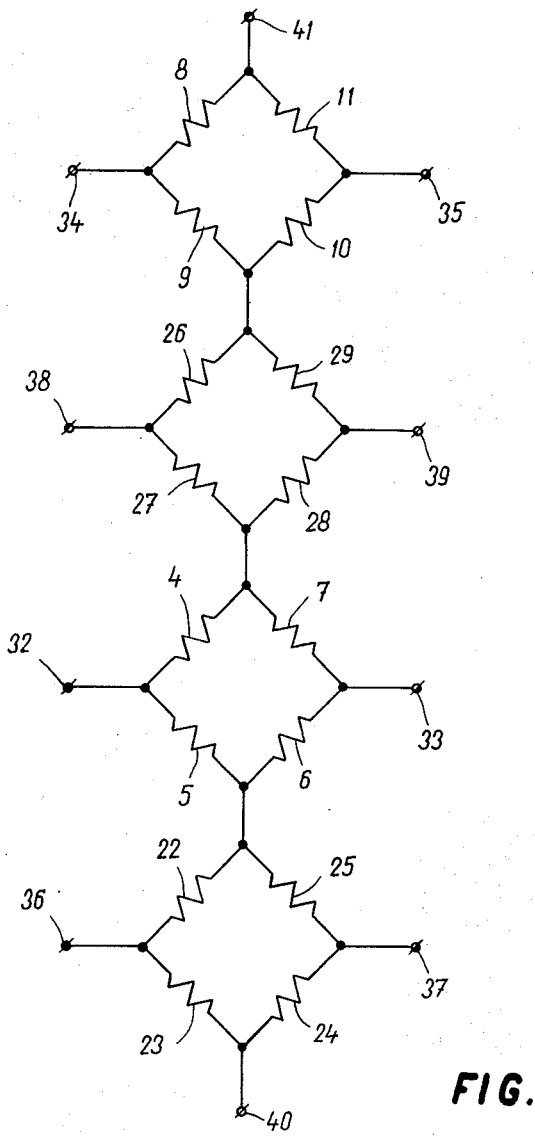
FIG. 6 is a view in plan of a circuit arrangement of the resistors in FIG. 5.

In FIGS. 5 and 6, which illustrate a third embodiment of tensometric sensing element according to the invention, the same or similar parts are designated by the same reference characters as e FIGS. 1 and 2 but with the postscript b. The embodiment illustrated in FIGS. 5 and 6 comprises two identical smaller diaphragms 2b, 3b arranged on the edge of the main diaphragm 1b with diffused resistors 4b, 5b, 6b, 7b, 8b, 9b. 10b, 11b, located in the same manner as in the embodiments of FIGS. 1 and 3. Nearer to the center of the main diaphragm 1b there are two other identical recesses arranged in opposite relationship and forming third and fourth identical smaller diaphragms 30b, 31b. These two further diaphragms 30b, 31b are arranged with their outer edges as near as possible to an imaginary circle A circumscribed from the center of the main diaphragm 1b tangent to the inner edges of the first and second smaller diaphragms 2b, 3b. The common axis of the first and second smaller diaphragms 2b, 3b coincides with one diameter of the main diaphragm 1b. The common axis of the third and fourth diaphragms 30b, 31b coincides with another diameter of the main diaphragm 1b. This arrangement, in which the axes of all four smaller diaphragms 2b, 3b, 30b, 31b do not coincide with the same diameter of the main diaphragm 1b permits obtaining in an easier manner maximum approximation of the outer edge of the third and fourth smaller diaphragms 30b, 31b to the above-mentioned imaginary circle A. The resistors on the third and fourth smaller diaphragms 30b, 31b are arranged so that the first and second resistors 22b, 24b, and 26b, 28b are on the common axis of the third and fourth smaller diaphragms 30b, 31b, one closely after the other, as near as possible to the other edges of these diaphragms. The third and fourth resistors 23b, 25b of the third smaller diaphragm 30b, and the third and fourth resistors 27b, 29b of the fourth smaller diaphragm 31b are located at right angles to the said axis in such a manner that the third resistors 23b, 27b and the fourth resistors 25b, 29b on the edges of the smaller diaphragms 30b, 31b nearer to the center of the main diaphragm 1. As illustrated schematically in FIG. 6, the diffused resistors on each smaller diaphragm 2b, 3b, 30b, 31b form a separate bridge with terminals 32b, 33b, 34b, 35b, 36b, 37b, 38b, 39b of separate supply sources. The output diagonals of these bridges are in series with the output terminals 40b, 41b.

In the embodiment of the sensing element illustrated in FIGS. 5 and 6, unlike the function of the first and second smaller diaphragms 2, 3, the first and second resistors 22b, 24b, 26b, 28b of the third and fourth smaller diaphragms 30b, 31b pick up radial deformations from the main diaphragm and also from the smaller diaphragms, and the third resistors 23b, 27b pick up tangential deformations of the main diaphragm 1b and radial deformations of the smaller diaphragms 30b, 31b and the fourth resistors 25b, 29b pick up tangential deformations of the main diaphragm. The resultant sensitivity of the tensometric sensing element for gas and liquids is increased by the arrangement of further smaller diaphragms 30b, 31b. A further increase in the sensitivity of the tensometric sensing elements for the pressure in gases and liquids in accordance with the invention can be achieved by increasing the number of recesses located either over the edge of the main diaphragm or nearer to the center thereof.

In view of the small distances of the resistor diffused into the smaller diaphragms the elimination of the thermal dependence of the sensing element is very perfect.

The tensometric sensing element of gas and liquid pressure in accordance with the invention can be widely used in hydraulic and pneumatic measuring and regulating instruments and devices.

Although the invention is illustrated and described with reference to a plurality of preferred embodiments thereof, it is to be expressly understood that it is in no way limited to the disclosure of such a plurality of embodiments, but is capable of numerous modifications within the scope of the appended claims.

What is claimed is:

1. A tensometric pressure sensing element, comprising a main circular diaphragm, at least two smaller diaphragms formed by circular recesses in the said main diaphragm, and resistors arranged in a bridge circuit arrangement on each of the said smaller diaphragms.

2. A tensometric pressure sensing element as claimed in claim 1 wherein the main circular diaphragm is made of a semiconductor material, and the resistors on the said smaller diaphragms are formed thereon by diffusion.

3. A tensometric pressure sensing element as claimed in claim 2 wherein the said at least two smaller diaphragms are arranged on the edge of the said main diaphragm, one axis of the said smaller diaphragms coincides with the axis of the said main diaphragm, and the distance between the center of the said main diaphragm to the nearest place of the edge of a smaller diaphragm is a least 0.58 of the radius of the said main diaphragm.

4. A tensometric sensing element as claimed in claim 2 comprising a first and a third resistor on a first smaller diaphragm, and a first and third resistor on a second smaller diaphragm located on an axis coinciding with the axis of the said main diaphragm, each of said first and third resistors being disposed on one edge of the respective smaller diaphragm, and a second and a fourth resistor of the said first smaller diaphragm, and a second and a fourth resistor on the said second smaller diaphragm, said second and fourth diaphragms being located at right angles to the said axis of the said main diaphragm near the centers of the said smaller diaphragms.

5. A tensometric sensing element as claimed in claim 3 comprising a first and a third resistor on a first smaller diaphragm, and a first and third resistor on a second smaller diaphragm located on an axis coinciding with the axis of the said main diaphragm, each of said first and third resistors being disposed on one edge of the respective smaller diaphragms, and a second and a fourth resistor of the said first smaller diaphragm, and a second and a fourth resistor on the said second smaller diaphragm, said second and fourth diaphragms being located at right angles to the said axis of the said main diaphragm near the centers of the said smaller diaphragms.

6. A tensometric sensing element as claimed in claim 2 wherein each smaller diaphragm carries four resistors, the said four resistors of each smaller diaphragm are connected in a separate bridge circuit, and the separate bridge circuits are connected in parallel.

7. A tensometric sensing element as claimed in claim 4 wherein each smaller diaphragm carries four resistors, the said four resistors of each smaller diaphragm are connected in a separate bridge circuit, and the separate bridge circuits are connected in parallel.

8. A tensometric sensing element as claimed is claim 5 wherein each smaller diaphragm carries four resistors, the said four resistors of each smaller diaphragm are connected in a separate bridge circuit, and the separate bridge circuits are connected in parallel.

9. A tensometric pressure sensing element as claimed in claim 4 wherein each of two resistors of a first of the said at least two smaller diaphragms located on the axis of the said main diaphragm is connected in series with one resistor of a second of the said at least two smaller diaphragms which is also arranged on the axis of the main diaphragm, each of two resistors of the said first smaller diaphragm arranged at right angles to the axis of the main diaphragm is connected in series with one resistor of the second smaller diaphragm which is also connected at right angles to the said axis of the said main diaphragm, and the series combination of the said two resistors form individual branches of a complex bridge.

10. A tensometric sensing element as claimed in claim 1 comprising two further recesses arranged in opposite relationship and nearer to the center of the said main diaphragm than to the said two smaller diaphragms, the said two further recesses forming a third and a fourth smaller diaphragm, respectively, the outer edges of the said third and fourth smaller diaphragms being as near as possible to an imaginary circle circumscribed from the center of the main diaphragm and substantially tangential to the inner edges of the said first and second smaller diaphragms.

11. A tensometric sensing element as claimed in claim 3 comprising two further recesses arranged in opposite relationship and nearer to the center of the said main diaphragm than the said two smaller diaphragms, the said two further recesses forming a third and a fourth smaller diaphragm, respectively, the outer edges of the said third and fourth smaller diaphragms being as near as possible to an imaginary circle circumscribed from the center of the main diaphragm and substantially tangential to the inner edges of the said first and second smaller diaphragms.

12. A tensometric sensing element as claimed in claim 9 comprising a separate bridge on each smaller diaphragm, each of the said separate bridges comprising resistors, and the output diagonals of the separate bridges on the said smaller diagonals being connected in series.

13. A tensometric sensing element as claimed in claim 10 comprising a separate bridge of resistors on each smaller diaphragm, and the diagonals of the said separate bridges being connected in series.

* * * * *